US005286119A

United States Patent [19]

Fischer

[11] Patent Number: 5,286,119

[45] Date of Patent: Feb. 15, 1994

[54] BEARING PLAY ADJUSTING ASSEMBLY

[75] Inventor: Christian M. M. Fischer, Marktheidenfeld, Fed. Rep. of Germany

[73] Assignee: Koenig & Bauer Aktiengesellschaft, Wurzburg, Fed. Rep. of Germany

[21] Appl. No.: 962,420

[22] Filed: Oct. 19, 1992

[30] Foreign Application Priority Data

Oct. 19, 1991 [DE] Fed. Rep. of Germany ........ P 41 34 573.8
Nov. 29, 1991 [DE] Fed. Rep. of Germany ........ P 41 39 327.9

[51] Int. Cl.[5] .............................................. F16C 17/10

[52] U.S. Cl. .................................... 384/571; 384/583; 384/584; 384/626

[58] Field of Search ............... 384/583, 571, 626, 584, 384/585, 519, 272

[56] References Cited

U.S. PATENT DOCUMENTS

| | | | |
|---|---|---|---|
| 3,009,747 | 11/1961 | Pitzer | 384/272 |
| 4,025,136 | 5/1977 | Ballendux | 384/583 |
| 5,082,299 | 1/1992 | Beattie | 384/519 |
| 5,161,904 | 11/1992 | Craft | 384/583 |

FOREIGN PATENT DOCUMENTS

| | | |
|---|---|---|
| 3331370 | 6/1984 | Fed. Rep. of Germany . |
| 3937788 | 11/1989 | Fed. Rep. of Germany . |
| 1162239 | 8/1969 | United Kingdom . |

*Primary Examiner*—Lenard A. Footland
*Attorney, Agent, or Firm*—Jones, Tullar & Cooper

[57] ABSTRACT

A bearing play adjusting assembly is useable to adjust the bearing play in an axle journal of a printing plate cylinder of a rotary printing press. A pressure plate is secured to an end of the axle journal and bears against an inner bushing. A shim plate is placed between the pressure plate and the axle journal end. The thickness of the shim plate can be changed to adjust the bearing play of the cylinder axle journal bearing.

4 Claims, 1 Drawing Sheet

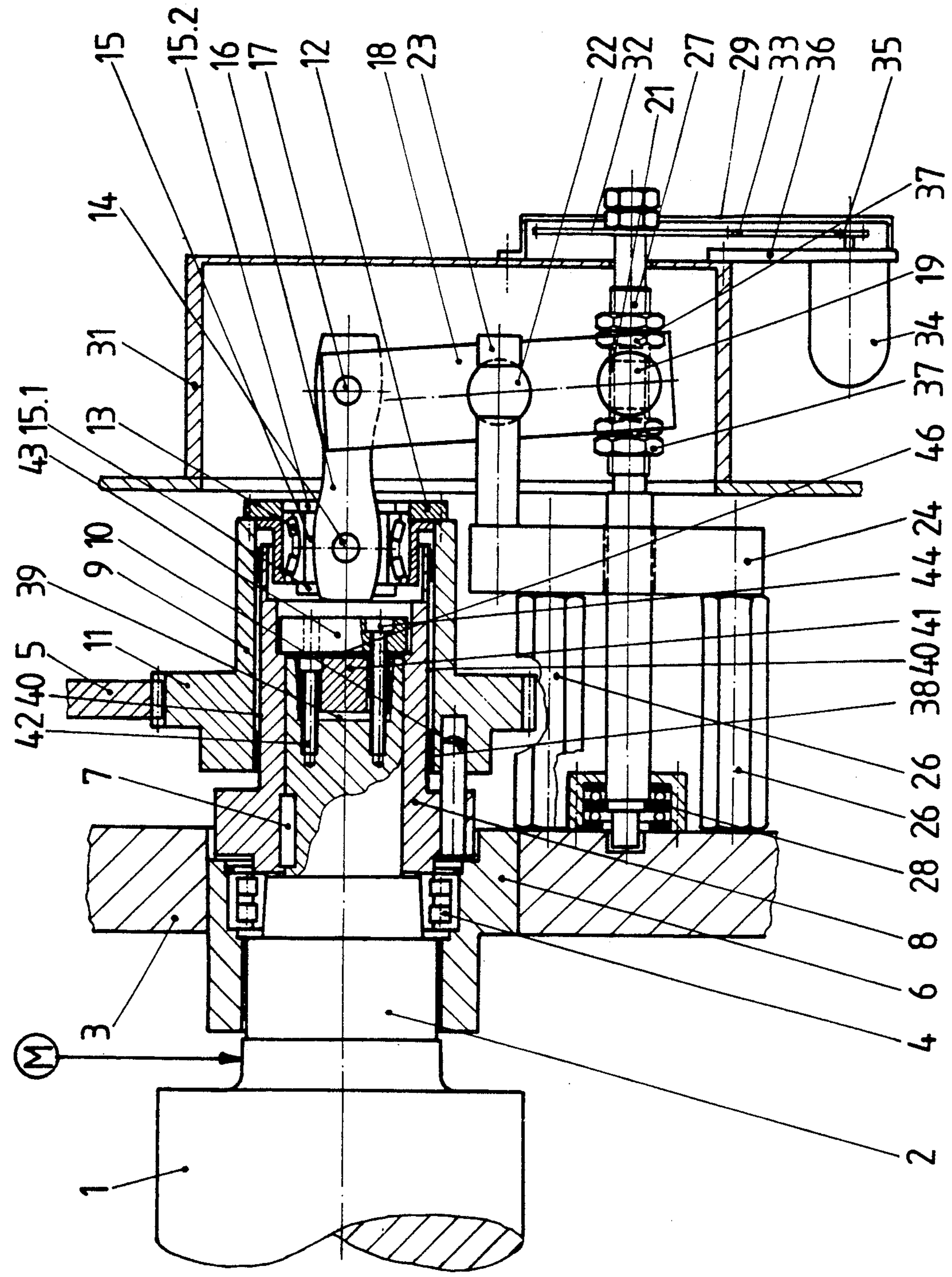
15
15.2
16
17
12
18
23
22
32
21
27
29
33
36
35
37
19
34
37
46
24
44
41
40
38
26
26
28
8
6
4
2
14
31
43
15.1
13
10
9
39
11
5
42
40
7
3
1
M

BEARING PLAY ADJUSTING ASSEMBLY

FIELD OF THE INVENTION

The present invention is directed generally to a bearing play adjusting assembly. More particularly, the present invention is directed to an arrangement for adjusting the bearing play in a cylinder of a printing press. Most specifically, the present invention is directed to a bearing play adjusting assembly for an axle journal of a plate cylinder of a printing press. The axle journal of the plate cylinder extends through a side frame of the printing press and receives devices such as toothed drive wheels, sliding bushings or the like. In order to be able to adjust the bearing play in cylinders of this type there is provided a shim that is interposed between a pressure disk and the end of the axle journal to which the pressure disk is secured.

DESCRIPTION OF THE PRIOR ART

Bearing play and the adjustability of bearing play in printing unit cylinders of various printing devices, such as for example those of a multicolor rotary printing press is of substantial importance. This is particularly the case to the extent that the appearance of duplications, or other printing defects may be associated with excess bearing play. Great demands are placed on the bearings of print unit cylinders. They must have as little play as possible so that the appearance of these duplications or other printing errors will be prevented to as great an extend as possible.

In German Letters Patent No. DE-PS 39 37 788 there is shown the use of adjusting rings which are screwed against a seating ring. The play of an axial bearing in the press cylinder can be adjusted by use of this adjusting ring. These devices for adjusting or readjusting of bearings are generally easily accessible. However, if the axle journals of the printing unit cylinders are sealed in the side frames of the printing press and extend through these side frames for receiving devices such as toothed drive wheels, sliding bushings or the like, the bearing play is much more difficult to adjust or readjust. Such adjustment or readjustment of the bearing play is only accomplished by removal of the toothed wheels and this is done only with a relatively large amount of effort.

It will thus be apparent that a need exists for a bearing play adjusting assembly which is usable with print unit cylinders that overcomes the limitations of the prior art devices. The arrangement for adjusting bearing play in accordance with the present invention provides such a device and is a significant advance over the prior art devices.

SUMMARY OF THE INVENTION

It is an object of the present invention to provide a bearing play adjusting assembly.

Another object of the present invention is to provide an arrangement for adjusting the bearing play in a cylinder of a printing press.

A further object of the present invention is to provide a bearing play adjusting assembly for an axle journal of a plate cylinder of a printing press.

Yet another object of the present invention is to provide a bearing play adjusting assembly that utilizes a shim plate.

Still a further object of the present invention is to provide a bearing play adjusting assembly that is simple and easily manipulated.

Even yet another object of the present invention is to provide a bearing play adjusting assembly which can be used for adjusting and readjusting the radial and axial bearing play without the necessity of removing toothed drive wheels.

As will be discussed in detail in the description of the preferred embodiment which is set forth subsequently, the bearing play adjusting assembly in accordance with the present invention is particularly intended for use with a printing press cylinder having an axle journal which extends through a side frame of the press and which carries various bushings, toothed wheels and drive means. The axially outboard end of the axle journal has a frustoconical recess which receives a cooperatively shaped frustoconical plug. A pressure disk is secured to the end of the frustoconical plug and contacts a shim plate which is placed between the pressure disk and the frustoconical plug. This shim plate is easily accessed and can be changed to increase or decrease the spacing between the pressure disk and the frustoconical plug or the end of the cylinder axle journal. The bearing play can be compensated for or adjusted by proper selection of a shim plate of suitable thickness.

The primary advantage of the bearing play adjusting assembly in accordance with the present invention resides in its ability to allow the adjustment or readjustment of bearing play without the dismantling of the cylinder drive assembly. In the present invention, it is only necessary to remove a pressure disk and to change or adjust the thickness of a shim plate to restore the proper taper ratio in the bearing assembly. The play in the assembly is also removed by use of the frustoconical plug body that is placed in the frustoconical recess in the axial end of the axle journal of the plate cylinder. As the plug body is forced into the recess, it expands the shell-like end of the axle journal radially outwardly. This expansion of the axle journal end is used to force the inner bushing radially outwardly so that the play between it and the outer bushing is reduced.

The assembly for adjusting bearing play in accordance with the present invention allows for bearing play to be adjusted in a simple, easy, straightforward manner. As such it overcomes the limitations of the prior devices and is a substantial advance in the art.

BRIEF DESCRIPTION OF THE DRAWINGS

While the novel features of the bearing play adjusting assembly in accordance with the present invention are set forth with particularity in the appended claims, a full and complete understanding of the invention may be had by referring to the detailed description of the preferred embodiment which is presented subsequently, and as illustrated in the accompanying sole drawing FIGURE which is a cross-sectional view through a preferred embodiment of a bearing play adjusting assembly in accordance with the present invention.

DESCRIPTION OF THE PREFERRED EMBODIMENT

Referring now to the sole drawing FIGURE, there may be seen a preferred embodiment of a bearing play adjusting assembly in accordance with the present invention. This adjusting assembly will be depicted and discussed for use with a device for adjusting the circumferential register of a plate cylinder in a rotary printing press in which an axially movable adjusting drive is used with an axially displaceable helically-geared toothed drive wheel to adjust the circumferential register of the printing plate cylinder.

A portion of a plate cylinder, generally at 1 is depicted in the sole drawing FIGURE. It will be understood that plate cylinder 1 will carry one or more printing plates on its surface and will cooperate with a rubber blanket cylinder, not shown, as well as an ink applicator roller of an off set printing press which is also not shown in the drawing. These portions of the rotary printing press are generally conventional in nature and form no part of the present invention.

Plate cylinder 1 has an elongated axle journal 2 which is rotatably supported by a tapered roller bearing 4. This roller bearing 4 is, in turn, enclosed in an eccentric bushing 6 which is fastened in a side wall 3 of the rotary press frame. A bearing with a conical inner race or conical inner bore is preferably employed as bearing 4. A first, inner bushing 8 is joined to an outboard end of the axle journal 2 by means of at least one feather key 7 or other similar fastening means. This inner bushing 8 is generally cylindrical and surrounds the axially outer end of the axle journal 2. A first, axially inner end of bushing 8 engages a side face of roller bearing 4. A second, outer bushing 9 is concentric with, and surrounds the inner bushing 8. The two bushings 8 and 9 are connected together so that there is no relative rotational movement between them. This is accomplished by using one or more drive pins such as a rotary driver 10 which can be a bolt. The two bushings 8 and 9 can move axially with respect to each other. A helically splined drive wheel 11 is formed on the outer peripheral surface of the second, outer bushing 9. This helically toothed drive wheel 11 meshes with a complimentary helically toothed or splined drive gear 5 which is part of the drive of the plate cylinder 1.

As may be seen in the sole drawing FIGURE, an end face of the outer bushing 9 which is most remote from the plate cylinder 1 is connected through a ring 12 with an outer ring or race of a roller bearing assembly 13. The ring 12 can be secured to the end f ace of the outer bushing 9 by screws or the like. This roller bearing 13 can be embodied as a self-aligning bearing. An inner ring or race of the bearing 13 is coupled or connected with a linking point 14 of an axially shiftable coupler 16. This linking point 14 can be embodied as a gimbal-mounted tapered roller bearing. This roller bearing assembly 13 also includes a coupler bushing 15 which is interposed between the inner race of bearing 13 and the surface of an inner end of the coupler 16 generally in the area of link point 14. The bushing 15 includes an inner collar 15. 1 on the end of bushing 15 closer to the journal axle 2 and a threaded end which will receive a threaded nut 15.2. The use of the threaded nut 15.2 on the threaded portion of the coupler bushing 15 secures the coupler bushing 15 in place in engagement with the roller bearing 13. The bushing 15 also has a gimbal-mounted linking point 14 which may be in the form of a bolt.

An axially outer end of the coupler 16; i.e. an end further away from the axle journal 2, is pivotably connected by means of a linking point 17 with an upper end portion of a two-armed lever 18. Both the upper end portion of the two armed lever 18 and a corresponding lower end portion can be fork-shaped. The lower, fork-shaped end of the two arm lever 18 carries a transversely extending bolt 19 which extends between the two spaced tines of the fork-shaped lower end of the two armed lever 18. This transverse bolt 19 has a threaded bore 21 which is generally perpendicular to the longitudinal axis of bolt 19 and which is preferably positioned equidistant between the two spaced tines of the fork-shaped lower end portion of two armed lever 18.

Generally at its midpoint, the two armed lever 18 is pivotably supported by a pivot seating point 22. This pivot seating point 22 is generally in the form of a shaft. This seating point or shaft 22 is supported on a support 23 which is attached at its inner end to a support plate 24. This support plate 24 has at least three support bolts 26 which are connected to the side wall 3 of the printing press. This seating point 22 for the two armed lever 18 is securely supported by the press frame 3.

A threaded spindle 27 is supported in the threaded bore 21 of the bolt 19 that is carried between the two spaced tines of the lower, fork-shaped end of the two armed lever 18. This threaded spindle 28 has its longitudinal axis generally parallel to the longitudinal axis of the axle journal 2. An inner end of the threaded spindle 27 is supported in a bearing 28 which is attached to the side wall 3 of the press. The axially shiftable coupler 16, the two-armed lever 18, and the threaded spindle 27 are located within a housing 31 with a lower portion of the housing having a cover 29. An outer end of the threaded spindle 27 is rotatably supported by this cover 29. A toothed ring or sprocket 32 is secured to the outer end of the threaded spindle 27 within the cover 29. A drive chain 33 passes around the toothed ring or sprocket 33 and also around a toothed ring 35 or drive sprocket that is secured on a shaft of drive motor 34. The drive motor 34 is fastened to the cover 29 by way of its base plate 36. The threaded spindle 27 is provided with adjustable stops 37 on either side of the transverse bolt 19 to limit its range of adjustment.

As the motor 34 is operated, the drive sprocket 35 will turn. This causes the chain 33 to move the sprocket 32 and thus to cause the threaded spindle 27 to rotate. As the threaded spindle 27 turns, the transverse bolt 19 moves axially along the spindle 27, either toward or away from the side wall 3, in accordance with the direction of rotation of the spindle 27. This movement of the transverse bolt 19 causes the two armed lever 18 to pivot about its seating or pivot point 22. The result of this pivotal movement of the two armed lever 18 is an axial displacement of the coupler 16 and hence of the roller bearing 13 and the ring 12 which is attached to the bearing 13 and to the outboard end of the outer bushing 9. As the outer bushing 9 moves axially, it is caused to also rotate because of the relative axial motion between the helically splined ring 11 on the outer bushing 9 and the helically splined gear drive 5. This rotation of the outer bushing 9 results in a corresponding rotation of the inner bushing 8 because of the drive pin or pins 10 that connect the two bushings 8 and 9. Rotation of the inner bushing 8 is communicated to the axle journal 2 through the key 7 so that the axle journal 2 and hence the plate cylinder 1 will be rotated to effect circumferential register adjustment of a printing plate supported on the surface of the plate cylinder 1.

Since the inner and outer bushings 8 and 9 must be free to shift axially with respect to each other, a certain amount of play 38 must be provided between them. This play 38 must be controlled. Too little play 38 will result in binding between the inner and outer bushings 8 and 9.

Too much play will allow the outer bushing 9 to move out of concentricity with the inner bushing 8. To reduce this play 38 between the inner and outer bushings 8 and 9, the outboard end of the axle journal 2 is provided with a frustoconical bore or recess 39 which extends into the axle journal 2, and which tapers toward the plate cylinder 1. This recess 39 can receive a frustoconical expander body 41 that is held in place by a plurality of clamping screws 42. As these clamping screws 42 are tightened, the effect is to enlarge the hollow end of the axle journal 2 and to thereby radially expand the shell 40 of the inner bushing 8. This radial expansion of shell 40 decreases the amount of play between the inner and outer bushings 8 and 9. An end or pressure plate 43 is used to hold the inner bushing 8 on the axle journal 2. This pressure plate 43 is held on the end of the axle journal 2 by a plurality of elongated screws 44. Preferably four such screws 44 which are offset at 90° to each other are used to secure the pressure plate 43 to the outboard end of the axle journal 2. The clamping screws 42 which are used to expand the end of the axle journal 2 by movement of the frustoconical body or expander 41 can be accessed through holes in the end plate 43. Four such clamping screws 42 can be used and each will be spaced between two elongated screws 44.

A generally disk-shaped shim plate 46 is disposed between the axially outer end of the axle journal 2 and the pressure disk or plate 43. This shim plate 46 has a plurality of apertures which allow access to the clamping screws 42 and which also allow the elongated screws 44 that hold the pressure plate 43 to the end of the axle journal to pass through the shim plate 46. If it becomes necessary to readjust or adjust the cylinder roller bearing 4 because of bearing or journal wear, the screws which hold the ring 12 to the end of the outer bushing 9 are first removed. This allows the roller bearing 13 and the shiftable coupler 16 to be quickly and easily removed. Once this has been done, the elongated screws 44, which hold the pressure plate 43 in place, can also be removed. It is now possible to reduce the thickness of the shim plate 46 by a desired amount. If, for example, a radial play of 0.01 mm is measured on the axle journal 2 at a point indicated by the arrow M through the use of a dial indicator, an amount of 0.12 mm must be reset in a tapered roller bearing with a taper ratio of 1:12 by reducing the thickness of the shim 46 by this amount. The shim plate 46 can either be cut down to reduce its thickness or a shim plate having a reduced thickness can be substituted for the previously used thicker one. While the pressure plate 43 is removed, the play between the inner and outer bushings 8 and 9 can also be measured and readjusted by use of the plug body 41, as discussed previously. After these adjustments have been made, the shim plate having the correct thickness, and which can be made of metal or plastic, is installed and the pressure plate 43 is reinstalled and tightened. Since the shim plate 46 is now thinner, the bearing 4 will be shifted slightly to the left, as seen in the sole drawing FIGURE by the inner bushing 8, to eliminate the play previously detected.

While a preferred embodiment of a bearing play adjusting assembly in accordance with the present invention has been set forth fully and completely hereinabove, it will be apparent to one of skill in the art that a number of changes in, for example the size of the plate cylinder, the number of printing plates carried by the plate cylinder, the type of bearing assemblies and the like could be made without departing from the spirit and scope of the present invention which is accordingly to be limited only by the following claims.

What is claimed is:

1. A bearing play adjusting assembly which is useable to effect adjustment of bearing play in a cylinder of a printing press, said bearing play adjusting assembly comprising:

- an axle journal extending from a plate cylinder and being rotatably supported in a printing press;
- a bearing having a conical inner race rotatably supporting said axle journal;
- an inner bushing carried by said axle journal and having a first end which is engageable with said bearing;
- a pressure plate securable to an end of said axle journal and engageable with said inner bushing;
- a shim removably positioned between said pressure plate and said end of said axle journal;
- an outer bushing concentrically supported on, and axially shiftable with respect to said inner bushing; and
- means to adjust circumferential play between said inner and outer bushings.

2. The bearing play adjusting assembly of claim 1 wherein said shim is made of metal.

3. The bearing play adjusting assembly of claim I wherein said shim is made of plastic.

4. The bearing play adjusting assembly of claim 1 wherein said means to adjust circumferential play includes a frustoconical recess in an end of said axle journal and a frustoconical body receivable in said recess and slidable thereon to vary a diameter of said axle journal and said inner bushing.

* * * * *